US012640399B2

(12) United States Patent
Huang et al.

(10) Patent No.: US 12,640,399 B2
(45) Date of Patent: **\*May 26, 2026**

(54) LOCALIZED HIGH SALT CONCENTRATION ELECTROLYTE

(71) Applicant: Wildcat Discovery Technologies, Inc., San Diego, CA (US)

(72) Inventors: Jinhua Huang, San Diego, CA (US); Bin Li, San Diego, CA (US); Peter Bennington, San Diego, CA (US); Tyler Stanley, San Diego, CA (US)

(73) Assignee: Wildcat Discovery Technologies, Inc., San Diego, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/134,127

(22) PCT Filed: Dec. 21, 2023

(86) PCT No.: PCT/US2023/085486
§ 371 (c)(1),
(2) Date: May 29, 2025

(87) PCT Pub. No.: WO2024/145180
PCT Pub. Date: Jul. 4, 2024

(65) Prior Publication Data
US 2026/0011788 A1 Jan. 8, 2026

Related U.S. Application Data

(60) Provisional application No. 63/435,662, filed on Dec. 28, 2022.

(51) Int. Cl.
*H01M 10/0568* (2010.01)
*H01M 10/0525* (2010.01)
*H01M 10/0569* (2010.01)

(52) U.S. Cl.
CPC .................. *H01M 10/0568* (2013.01); *H01M 10/0569* (2013.01); *H01M 10/0525* (2013.01);
(Continued)

(58) Field of Classification Search
CPC ......... H01M 10/0568; H01M 10/0569; H01M 10/0525
See application file for complete search history.

(56) References Cited

U.S. PATENT DOCUMENTS 8,936,878 B2 1/2015 Morin
9,172,085 B2 10/2015 Divigalpitiya et al.
(Continued)

FOREIGN PATENT DOCUMENTS

WO 2022178271 A1 8/2022

OTHER PUBLICATIONS

Cao, Xia et al., "Review—Localized High-Concentration Electrolytes for Lithium Batteries," J. Electrochem. Soc. 168 010522 (13 pages).
(Continued)

*Primary Examiner* — Brittany L Raymond
(74) *Attorney, Agent, or Firm* — Young Basile Hanlon & MacFarlane, P.C.

(57) ABSTRACT

A battery includes an electrolyte comprised of a solvating solvent, diluent, and a lithium salt. The electrolyte is a solution having a saturation point, the lithium salt being at least 5 times more soluble in the solvating solvent than in the diluent. The diluent and the solvating solvent are immiscible at a molar ratio of diluent/solvating solvent of 2 or more, and the solvating solvent and diluent are present in the electrolyte at a diluent/solvating solvent molar ratio of 0.1 to less than 2.

16 Claims, 10 Drawing Sheets

(52) U.S. Cl.
CPC .............. *H01M 2300/0034* (2013.01); *H01M 2300/0037* (2013.01)

(56) References Cited

U.S. PATENT DOCUMENTS

| | | | |
|---|---|---|---|
| 9,276,257 | B2 | 3/2016 | Takeuchi et al. |
| 10,367,232 | B2 | 7/2019 | Zhang et al. |
| 11,094,966 | B2 | 8/2021 | Ren et al. |
| 11,127,980 | B2 | 9/2021 | Zhang et al. |
| 11,600,859 | B2 | 3/2023 | Cao et al. |
| 11,664,536 | B2 | 5/2023 | Xu et al. |
| 11,705,580 | B2 | 7/2023 | Cao et al. |
| 2016/0141603 | A1 | 5/2016 | Guerfi et al. |
| 2019/0148775 | A1* | 5/2019 | Zhang ............... H01M 10/0567 429/331 |
| 2019/0229373 | A1* | 7/2019 | Kohyama ......... H01M 10/0568 |
| 2022/0059816 | A1 | 2/2022 | Yi et al. |

OTHER PUBLICATIONS

International Preliminary Report on Patentability issued in co-pending Application PCT/US2023/085486 mailed Mar. 31, 2025 (21 pages).

International Search Report and Written Opinion issued in co-pending Application PCT/US2023/085486 mailed May 30, 2024 (11 pages).

Jiang, Gaoxue et al., "Perspective on High-Concentration Electrolytes for Lithium Metal Batteries," Small Struc. 2021, 2, 2000122 (8 pages).

OECD Guideline for the Testing of Chemicals. Partition Coefficient (n-octanol/water): Shake Flask Method, Jul. 27, 1995 (4 pages).

* cited by examiner

LOCALIZED HIGH SALT CONCENTRATION ELECTROLYTE

CROSS-REFERENCE TO RELATED APPLICATIONS

This application is a National Stage 371 entry of International Application No. PCT/US2023/085486 which was filed on Dec. 21, 2023, and published as WO2024/145180, which claims the benefit of U.S. Provisional Application 63/435,662 filed on Dec. 28, 2022. The entire contents of these applications are incorporated herein by reference in their entirety.

FIELD

This disclosure relates to a liquid localized high salt concentration electrolyte for a battery.

BACKGROUND

New batteries are utilizing lithium metal anodes with various cathodes to improve battery properties. When cycling a battery, the stripping and plating of lithium on the anode may lead to formation of high surface area lithium and lithium dendrites. This may lead to capacity fade in batteries. To help stabilize batteries, high salt concentration electrolytes have been formulated and demonstrated to improve cycle performance. In these types of high salt concentration electrolytes, it is believed essentially all of the solvent molecules are involved in solvating the salt cations minimizing, for example, the formation of solid electrolyte from decomposition/reaction of the solvent. This enables reduction of the salt anion for solid electrolyte (SEI) formation and may also increase the electrochemical stability of the electrolyte. The increased salt concentration also reduces ionic concentration gradients at the electrode, which may be responsible for inhomogeneous lithium deposition during cycling. A disadvantage to the super concentrated electrolytes is the high viscosity of the formulation due to its high salt concentration, which may be detrimental, for example, to the power performance of the battery. Recently to attempt remedy some of the shortcoming of high salt concentration electrolytes, a diluent solvent has been added to the high salt concentration electrolyte to form a localized high salt concentration electrolyte that has desirable viscosity while retaining some of the performance improvements of high concentration electrolytes (see, for example, U.S. Pat. Nos. 11,094,966 and 10,367,232).

To utilize the advantage of localized high salt concentration electrolytes while maintaining or improving desirable discharge capacity and capacity retention, the diluent, solvating solvent, and lithium salt must be compatible with each other and the anode and cathode materials. However, minimal insight has been put forward as to what parameters provide for compositions of the electrolytes that are compatible with each other or other components of the battery. Accordingly, what is needed are combinations of electrolyte components that are useful to take advantages of localized high salt concentration electrolytes such as reduced viscosity, beneficial solid electrolyte interface layer formation, and increased electrochemical stability for varying anodes and cathodes and combinations thereof with improved, for example, discharge capacity, capacity retention and rate of discharge capability.

SUMMARY

The present disclosure provides for a battery comprising new electrolyte formulations.

The battery may comprise an anode, a cathode, and/or a separator.

In one aspect, the disclosure includes a battery that includes an electrolyte comprised of a solvating solvent, diluent, and a lithium salt. The electrolyte is a solution having a saturation point, the lithium salt being at least 5 times more soluble in the solvating solvent than in the diluent. The diluent and the solvating solvent are immiscible at a molar ratio of diluent/solvating solvent of 2 or more, and the solvating solvent and diluent are present in the electrolyte at a diluent/solvating solvent molar ratio of 0.1 to less than 2. The lithium salt may be less than 10 times more soluble in the solvating solvent.

In another aspect, the disclosure includes a battery that includes an electrolyte comprised of a solvating solvent, diluent, and a lithium salt, the electrolyte being a solution having a saturation point, the lithium salt being at least 5 times more soluble to less than 10 times more soluble in the solvating solvent than in the diluent, and the solvating solvent and diluent are present in the electrolyte at a diluent/solvating solvent molar ratio of 0.1 to less than 5.

In some aspects, the diluent may have a miscibility point in the solvating solvent and the lithium salt has a saturation point in the solvating solvent such that the saturation point of the lithium salt in the solvating solvent is at least 5 times greater than the miscibility point of the diluent in the solvating solvent. The saturation point/miscibility point may be from 5 to 10. The diluent and the solvating solvent may be present in a molar ratio of 0.5 to 1.8. The diluent and the solvating solvent may be present in a molar ratio of 0.8 to 1.5. The lithium salt and the combination of the solvating solvent and the diluent may be present in a molar ratio 1:2 or more. The lithium salt may be present in a molar concentration of about 0.5 M to about 3 M. The lithium salt may be present in an amount from 20 percent below to the saturation point of the solution. The amount of lithium salt in the solution may be in excess of the saturation point of the solvating solvent present in the solution.

In another aspect, the disclosure includes a battery that includes a lithium salt; a solvating solvent that dissolves the lithium salt; and a diluent that is miscible with the solvating solvent. The lithium salt is at least 5 times more soluble in the solvating solvent than the miscibility of the diluent in the solvating solvent. The solvating solvent and diluent typically are present in the battery at a battery diluent/solvating solvent molar ratio of 0.1 to less than 3.0.

In some aspects, the diluent and the solvating solvent may be present in a molar ratio of 0.5 to 3.0. The diluent and the solvating solvent may be present in a molar ratio of 1.0 to 3.0. The lithium salt may be at least 5 times to 10 times more soluble in the solvating solvent than the miscibility of the diluent in the solvating solvent.

The battery may include an anode such as one or more of graphite, lithium, lithium alloy, silicon, and a silicon alloy. The concentrations of lithium salt and diluent may be within about 20 percent of phase separation in the electrolyte.

In some aspects, the diluent may include a fluorinated ether. The fluorinated ether may include an n-butyl group or an isobutyl group. The fluorinated ether may include one or more of hexafluoroisopropyl methyl ether; 1,1,2,2-tetrafluoroethyl ethyl ether; 1H,1H,5H-octafluoropentyl 1,1,2,2,-tetrafluoroethyl ether; 1,2-(1,1,2,2,-tetrafluoroethoxy) ethane; 1,3-(1,1,2,2-Tetrafluoroethoxy)propane; 1,1,2,3,3,3-hexafluoro propyl 2,2,2-trifluoroethyl ether; n-butyl 1,1,2,2-tetrafluoroethyl ether; 1,1,2,2-Tetrafluoroethyl isobutyl ether; and 1H,1H,2'H,3H-decafluoro dipropyl ether.

In some aspects, the solvating solvent may include one or more dialkoxy alkanes, dialkyl glycol ethers, disubstituted esters, disubstituted carbonates, trisubstituted phosphates, disubstituted sulfones, and tetrasubstituted silanes.

In some aspects, a method of forming an electrolyte comprises dissolving a lithium salt in a solvating solvent to form a solvating solvent-lithium salt solution; dissolving a diluent in the solvating solvent-lithium salt solution; and further dissolving more lithium salt to a concentration that exceeds the amount of the lithium salt soluble in the solvating solvent present to form the electrolyte. In the method, the lithium salt may be present in the electrolyte below the saturation point of the salt in the electrolyte.

In some aspects, an electrolyte is comprised of a solvating solvent, diluent, and a lithium salt. The electrolyte is a solution having a saturation point, and the solvating solvent has a saturation point. The lithium salt is at least 5 times more soluble in the solvating solvent than in the diluent. The lithium salt is present in an amount below its saturation point in the electrolyte and above its saturation point in the solvating solvent (neat solvating solvent).

The battery may have a capacity retention of 80 percent at 160 cycles or more. The battery may have a capacity of about 150 mAh/g or more. The battery may include a cathode including one or more of a phosphates, fluorophosphates, fluorosulfates, fluorosilicates, spinels, lithium-rich layered oxides, and disordered rock salts.

New combinations of solvating solvents and diluents with lithium salts have been discovered, which may be utilized in batteries having lithium anodes. These new combinations may be particularly useful in batteries that comprise a lithium metal anode including anode-less cells (one in which only a metal current collector such as Cu is present until the first charging of the battery) because the formulations may mitigate formation of lithium dendrites and high surface area lithium over time, which may be attributed to the increased salt concentration which may lead to a decreased ionic concentration gradient at the electrode. The enhanced discharge capacity and/or capacity retention may be due to the combination of using the diluents that do not negatively impact the solvation structures of the solvating solvents around the lithium salts and that are electrochemically stable at both the cathode and the anode.

Additionally, the present disclosure provides for new combinations of diluents and solvating solvents that are both miscible with each other and that provide batteries having desirable capacities and capacity retentions. Structural changes to the diluent may change the miscibility of the diluent in the solvating solvent. For example, a linear solvent molecule may have different solubility properties compared to a branched solvent molecule. Miscibility is required to realize desirable localized high concentration electrolytes. The present disclosure provides for combinations that utilize diluents with different chemical structures resulting in localized high salt concentration electrolytes that have desirable electrochemical performance in a battery.

DETAILED DESCRIPTION

Figure 1A:
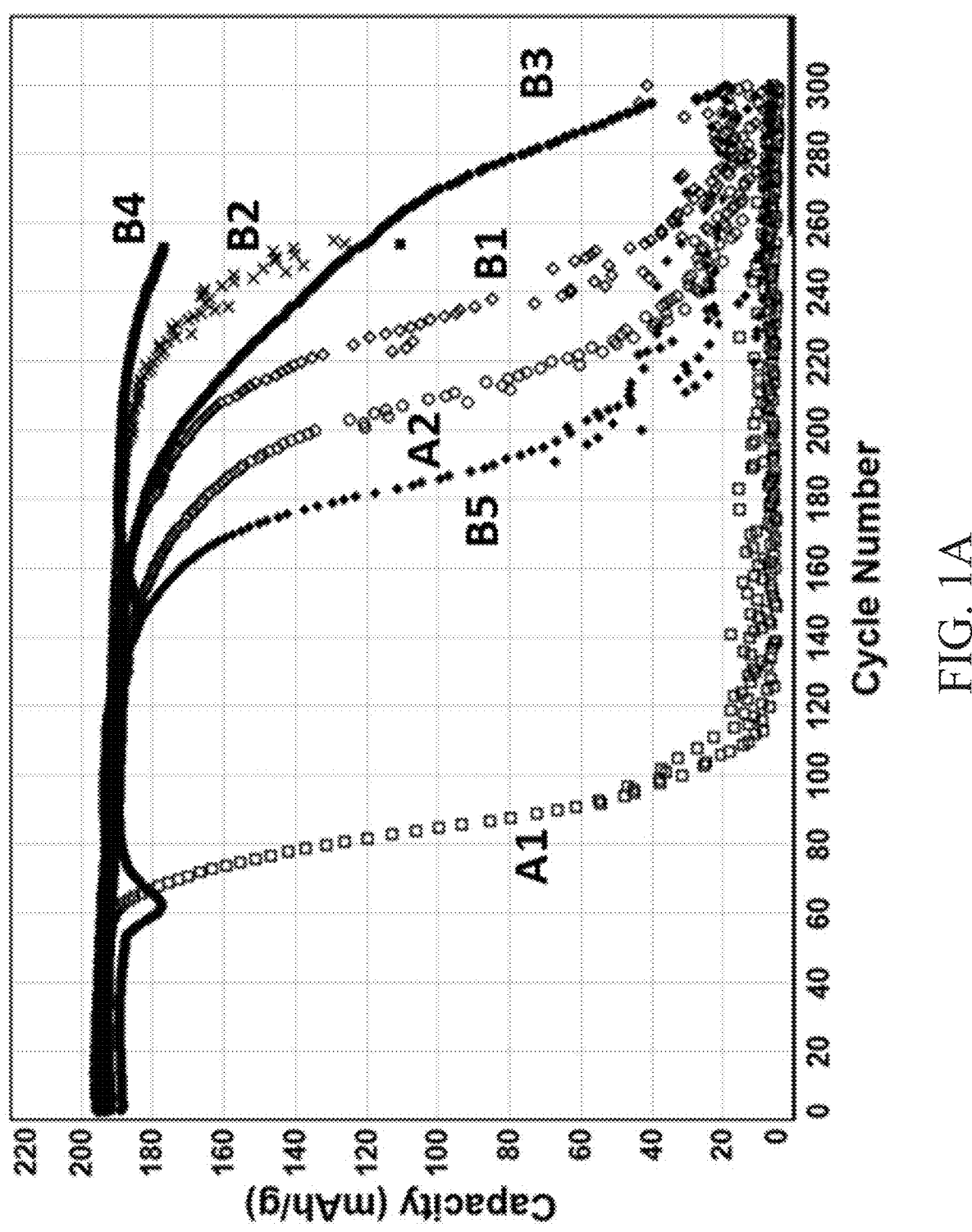
FIGS. 1A-1B illustrate the discharge capacity and capacity retention of five different diluents in Localized High Concentration Electrolyte ("LHCE") containing LiFSI salt and solvating solvent dimethoxy ethane ("DME").

Definitions of specific functional groups and chemical terms are described in more detail below. For purposes of this invention, the chemical elements are identified in accordance with the Periodic Table of the Elements, CAS version, Handbook of Chemistry and Physics, $75^{th}$ Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March *March's Advanced Organic Chemistry*, $5^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, $3^{rd}$ Edition, Cambridge University Press, Cambridge, 1987; the entire contents of each of which are incorporated herein by reference.

The terms "halo" and "halogen" as used herein refer to an atom selected from fluorine (fluoro, —F), chlorine (chloro, —Cl), bromine (bromo, —Br), and iodine (iodo, —I). The term "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Aliphatic groups may contain 1-40 carbon atoms, 1-20 carbon atoms, 2-20 carbon atoms, 1-12 carbon atoms, 1-8 carbon atoms, 1-6 carbon atoms, 1-5 carbon atoms, 1-4 carbon atoms, 1-3 carbon atoms, or 1 or 2 carbon atoms. Exemplary aliphatic groups include, but are not limited to, linear or branched, alkyl and alkenyl groups, and hybrids thereof such as (cycloalkyl)alkyl, (cycloalkenyl)alkyl or (cycloalkyl)alkenyl. The aliphatic groups may be unsubstituted or substituted. Substituted means that one or more C or H atoms is replaced with oxygen, boron, sulfur, nitrogen, phosphorus or halogen. Typically, one to six carbon atoms may be independently replaced by the aforementioned and in particular oxygen, sulfur or nitrogen. The aliphatic group may have one or more "halo" and "halogen" atoms selected from fluorine (fluoro, —F), chlorine (chloro, —Cl), bromine (bromo, —Br), and iodine (iodo, —I).

"Phase" as used herein means one or more compounds that are physically distinct and mechanically separable from another set of compounds.

"Miscible" means two or more compounds form a solution when contacted. The compounds may be completely miscible at any molar ratio (mole/mole), but in many instances the compounds are miscible below the solubility limit of one of the compounds in the other compound with each compound typically being a liquid solvent at ambient conditions (~20° C. and ~1 atmosphere of pressure), but in some instances one or more of the compounds (e.g., solvents) may be a solid at room temperature that is dissolved in a liquid solvent at room temperature.

"Immiscible" means two or more compounds phase separate at a molar ratio (mole/mole) that is greater than the miscible molar ratio (i.e., above the solubility limit as defined by the saturation point of one of the compounds within the other compound(s)).

"Miscibility point" refers to the maximum molar ratio (mole/mole) that a compound (e.g., solvent) is miscible with another compound to form a homogenous solution just prior to phase separation analogous to the saturation point of a solid dissolved in a liquid.

"Saturation point" means the molar ratio (mole/mole) that a compound (e.g., salt) is present in a solvent, that is the maximum amount by mole of the compound that can be dissolved in the solvent before equilibrium phase separation.

A "saturated solution" contains an amount of a soluble compound that is greater than the saturation point such that an amount of the soluble compound is precipitated.

"Soluble" means that a solid compound is dissolvable in a solvent or solution of solvents at or below the saturation point for example a salt dissolved in a solution of solvents.

If not otherwise specified any characteristic or property may be determined by standard laboratory practices for determining such properties or characteristics The boiling temperature may be determined by ASTM D86 if not generally available in the literature. "Solubility" may be determined by the 'shake flask' method based on the guidelines provided by OECD, Paris, 1981, Test Guideline 107, Decision of the Council C (81) 30 final. "Viscosity" may be determined by ATSM D445 if not generally available in the literature.

The electrolyte includes a diluent, a solvating solvent, and a lithium salt. It is understood that the diluent and solvating solvent are solvents. The diluent and solvating solvent may be contacted in the electrolyte at a molar ratio that is miscible. An amount of diluent may be used such that the diluent and solvating solvent are miscible when the lithium salt is dissolved in the solvating solvent. For example, in the presence of the lithium salt or without the presence of the lithium salt the diluent and the solvating solvent may become immiscible at a molar ratio of diluent/solvating solvent of about 0.5 or more, about 1.5 or more, about 2.0 or more, 2.5 or more, about 3.5 or more, or about 5.0 or more to essentially completely miscible, about 20 or less, or about 10 or less.

The diluent may function to lower the viscosity of the electrolyte while retaining the desired high salt concentration attributes useful for a battery. For example, when diluent is added to a solution of solvating solvent and lithium salt, the viscosity of the solution may be lowered and advantageous attributes retained or realized. The viscosity of the diluent is desirably less than the solvating solvent, and desirably is at least 5%, 10%, 25% or 50% less than the viscosity of the solvating solvent. The viscosity of the solution may be any amount sufficient to form an electrolyte with desirable discharge capacity and/or capacity retention. For example, the viscosity of the solution may be about 0.1 cP or more, about 3 cP or more, or about 5 cP or more. The viscosity of the solution may be about 15 cP or less, about 10 cP or less, or about 7 cP or less.

The diluent may have any level of miscibility with the solvating solvent sufficient to be used in a localized high concentration electrolyte. For example, the diluent may be completely miscible or may have a miscibility point in the solvating solvent of at most 10 (moles diluent/moles solvating solvent), about 5, or about 3 to at least about 0.5 or about 1. It has been surprisingly discovered that diluents that have limited miscibility in a solvating solvent may realize improved discharge capacity and capacity retention in some instances when the diluent is used at a molar ratio below but within 50%, 25% or 10% of the miscibility point of the diluent in the solvating solvent. As an illustration, the diluent may have a miscibility point of 2 to 5 molar ratio or 2 to 3 or 4 molar ratio, and the molar ratio of the diluent and solvent in the electrolyte is at or within 50%, 25% or 10% of the miscibility point of the diluent in the solvating solvent. Relative to the saturation point of the lithium salt in the solvating solvent, the miscibility point of the diluent in the solvating solvent may be about 3 times to about 15 times less, about 3 times to about 10 times less, about 3 times to about 8 times less, about 5 times to about 15 times less, about 5 times to about 10 times less, or about 5 times to about 8 times less than the saturation point of the lithium salt in the solvating solvent.

The miscibility of the diluent in the solvating solvent may change based on the presence of lithium salt that is dissolved in the solvating solvent. For example, the diluent may have a higher or lower miscibility with the solvating solvent in the presence of lithium salt, which may be at or below the saturation point in the solvating solvent or solution. The diluent may have a miscibility in the solvating solvent having salt dissolved therein that is from 1% to 20%, 10% or 5% of the miscibility point of the diluent in neat solvating solvent, with it being desirable for the diluent to have a higher miscibility in the presence of the salt in the solvating solvent.

The diluent may have a miscibility in the solvating solvent that is different than the solubility of the lithium salt in the solvating solvent. For example, the lithium salt may be between about 3 times, 5 times, or 7 times to about 10 times, about 13 times or 15 times more soluble by mole in the solvating solvent than the miscibility of the diluent in the solvating solvent. As an illustration, it may be desirable for the diluent to have a miscibility point of 2 or 3 to 5 molar ratio, and the amount of diluent present is within 10%, 25% or 50% of the miscibility point and the amount of salt that can be dissolved in the diluent is 5 to 10 times less, 5 to 9 times less, 5 to 8 times less, 6 to 10 times less, 6 to 9 times less, or 6 to 8 times less than the amount of salt that can be dissolved in the solvating solvent.

The structure of the diluent may alter the miscibility of the solvating solvent and the diluent. For example, a diluent with a linear alkyl group on the diluent may have a different miscibility in the solvating solvent compared to a miscibility of a diluent with a branched alkyl group. For example, a solvating solvent may be immiscible with diluent at a lower molar ratio when a branched alkyl group is present in the diluent, compared to when only linear alkyl groups are contained in the diluent, while still achieving desirable discharge capacity and capacity retention.

The electrolyte may include a combination of diluents with different substitutions. For examples, a combination of diluents containing linear alkyl groups, branched alkyl groups, or both may provide for a different miscible molar ratio with the solvating solvent while achieving desirable discharge capacity and capacity retention.

The electrolyte may include any number of different diluents sufficient to be miscible with the solvating solvent and/or adjust the viscosity of the electrolyte. For example, the electrolyte may include one or more, two or more, three or more, four or more, or a plurality of diluents.

The diluent may include one or more fluorinated ethers. The fluorinated ethers may be any compound that includes a combination of ether groups, fluorine atoms, and carbon atoms that are fully saturated with hydrogen.

Examples of fluorinated ethers may include one or more of 1,1,2,2-tetrafluoroethyl 2,2,3,3-tetrafluoropropyl ether (TTE); bis(2,2,2-trifluoroethyl) ether (BTFE), hexafluoroisopropyl methyl ether (HFPME); 1,1,2,2-tetrafluoroethyl ethyl ether (TFEEE); 1H,1H,5H-octafluoropentyl 1,1,2,2,-tetrafluoroethyl ether (OFPTFEE); 1,1,2,2-tetrafluoroethyl ether, 1,2-(1,1,2,2,-tetrafluoroethoxy) ethane (TFEE); 1,3-(1,1,2,2-Tetrafluoroethoxy) propane (TFEP), 1,1,2,3,3,3-hexafluoro propyl 2,2,2-trifluoroethyl ether (HFPTFEE); n-butyl 1,1,2,2-tetrafluoroethyl ether (BTFEE); 1H,1H,2'H, 3H-decafluoro dipropyl ether (DFDPE); 1,1,2,3,3,3-hexafluoropropyl ethyl ether (HFPEE); 1,1,1-trifluoro-2-[1-(2,2,2-trifluoroethoxy)ethoxy] ethane (TTFEEE); 1H,1H, 2'H-perfluorodipropyl ether (PFDPE); 1,1,2,2-tetrafluoroethyl isobutyl ether (TFEBE); 1,1,1,2,2,3,4,5,5,5-decafluro-2-methoxy-4-(trifluoromethyl) pentane; 1-(ethoxy) nonafluorobutane having a mixture of n- and iso-butyl isomers; 2-(trifluoromethyl)-3-ethoxydodecafluorohexane; 3-methoxyperfluoro(2-methylpentane); heptafluoropropyl 1,2,2,2-tetrafluoroethyl ether; 1,1,2,2-tetrafluoroethyl-2,2,2-trifluoroethyl ether (TFTFE); methoxynonafluorobutane (MOFB); ethoxynonafluorobutane (EOFB); tris(2,2,2-trifluroethyl) orthoformate; and di(2,2,2-trifluroethyl) carbonate.

The solvating solvent may function to provide solvating structures around the anion and/or cation of the lithium salt. To realize the desirable amount of salt dissolution in the electrolyte, in which some of the salt may be dissolved in the diluent, which may realize improved battery performance, the lithium salt may first be dissolved in the solvating solvent at or near the saturation point to form a solvating solvent-salt solution. The diluent may then be added to the solvating solvent-salt solution to form the electrolyte. Further salt may be added until at or near the saturation point of the salt in the electrolyte.

Since some of the lithium salt is soluble in the diluent, after the diluent is added to the solution of the solvating solvent and the lithium salt, an additional amount of lithium salt may be added up to or below the saturation point of the solution. Illustratively, the amount of salt may be at any useful concentration, but generally is essentially at or just below the saturation point, but may be adjusted depending, for example, the operating conditions expected for any particular battery (e.g., the amount of salt may be within 20%, 10% or 5% of the saturation point of the solvating solvent-diluent solution at ambient conditions). Additional lithium salt may be added to the combination of the diluent and the solvating solvent up to the saturation point of the solvating solvent, while the diluent and the solvating solvent are in a miscible molar ratio as described above. The amount of the salt in the solvating solvent-diluent solution may exceed the saturation point of the solvating solvent alone. For example, the amount of salt in solution may exceed the saturation point of the solvating solvent alone by between about 1 percent to about 25 percent, about 1 percent to about 10 percent, about 5 percent to about 25 percent, or about 5 percent to about 10 percent, based on the saturation point of the lithium salt in the solvating solvent alone. An amount of lithium salt below saturation of the solvating solvent-diluent solution may be desired when considering viscosity parameters or battery performance.

In some examples, the diluent and solvating solvent may be contacted first, and then the lithium salt may be contacted with the combined diluent and solvating solvent in an amount up to or below the saturation point of the combined diluent and solvating solvent. If the lithium salt is contacted with the solvating solvent, the diluent, or both in an amount above the saturation point of the solvating solvent, the diluent, or both, so that a saturated solution is formed, precipitated lithium salt may be removed from the saturated solution. If the lithium salt is contacted with the solvating solvent, in an amount above the saturation point of the solvating solvent, precipitated lithium salt may be removed before or after the addition of the diluent.

The solvating solvent has a solubility with the lithium salt that is different than the solubility of the lithium salt in the diluent. The solubility of the lithium salt in the diluent and the solvating solvent may affect the miscible molar ratio of the diluent/solvating solvent, when the lithium salt is present at or below the saturation point. For example, the miscible molar ratio of the diluent/solvating solvent may be higher or lower when the lithium salt is present at the saturation point in the solution of solvating solvent and diluent, compared when the lithium salt is absent.

The solvating solvent may be included based on the lithium salt being present at or below the saturation point so that the lithium salts may immobilize the solvating solvent and reduce its ability to form the SEI layer. The diluent and solvating solvent may be contacted at, above, or below a miscible molar ratio. The diluent and the solvating solvent may be contacted at or below the miscible molar ratio to provide superior discharge capacity and/or capacity retention. In some examples, when the solvating solvent, diluent, and lithium salt are contacted, the lithium salt may be present in a concentration that is at or below the saturation point in a miscible molar ratio of the diluent/solvating solvent in order to improve the discharge capacity and/or capacity retention of the battery.

The solvating solvent may have a saturation point of the salt that is practical to make the electrolyte. The saturation point of the solvating solvent may have a molar ratio of at least 1, about 2 or about 3 to about 10 or about 20. The viscosity of the solvating solvent may be any viscosity useful for making a battery. The viscosity of the solvating solvent at room temperature (~20° C.) may be 1 or more cP, 20 or more cP or 50 or more cP to 200 or less cP, 100 or less cP or 200 or less cP. Note, in some instances the solvating solvent may be a solid at room temperature. In such instances, solubilization of the salt results in the solvent becoming liquid due to freezing point depression.

The solvating solvent may be any solvent or combination of solvents that are miscible with the diluent at a useful molar concentration and/or can dissolve the lithium salt with or without the presence of the diluent. The electrolyte may include any number of solvating solvents sufficient to form desirable solvation around cation and/or anion of the lithium salt. For example, the electrolyte may include one or more, two or more, three or more, four or more, or a plurality of solvating solvents. The solubility of the salts in the solvating solvent and/or diluent may be essentially the same and or different. It may be desirable, for example, to have one salt that has a greater solubility (e.g., 5%, 10% or 20% more soluble than the other salts) in the diluent, which may be desirable in forming an advantageous SEI layer. In some examples, the solvating solvent may include one or more of dialkoxy alkanes, dialkyl glycol ethers, disubstituted esters, disubstituted carbonates, trisubstituted phosphates, disubstituted sulfones, and tetrasubstituted silanes.

Dialkoxy alkanes may include a pair of alkyl ethers bound by a $C_{1-12}$ alkane group that may be branched or linear. For example, dialkoxy alkanes may include one or more of dimethoxy ethane (DME), diethoxy ethane (DEE), 1,2-dimethoxypropane (DMP), The dialkoxy alkane may have the following structure:

$$R_1 \diagup O \diagdown [R_2 \diagup O]_n \diagdown R_1$$

where each $R_1$ may independently comprise a $C_{1\text{-}12}$ alkyl group that may be linear or branched, or any combination thereof.

Where $R_2$ may comprise a $C_{1\text{-}12}$ alkyl group that may be linear or branched, or any combination thereof.

Where n is an integer between 1 and 5.

Dialkyl glycol ethers may include a series of three either groups separated by alkyl chains that may be linear or branched. Example of dialkyl glycol eithers may include 1,2-diethylene glycol isopropyl methyl ether (DEGIM), diethylene glycol butyl methyl ether (DEGBM), or any combination thereof. The dialkyl glycol may have the following structure:

$$R_1 \diagup O \diagdown [R_2]_n \diagup O \diagdown [R_2]_n \diagup O \diagdown R_1$$

where each $R_1$ may independently comprise a $C_{1\text{-}12}$ alkyl group that may be linear or branched, or any combination thereof.

Where each $R_2$ may independently comprise a $C_{1\text{-}12}$ alkyl group that may be linear or branched, or any combination thereof.

Where each n is an integer between 1 and 5.

Disubstituted esters may include an ester that is substituted at the carbon atom of the carbonyl or the oxygen atom of the hydroxyl group by one or more groups including hydrogen, $C_{1\text{-}12}$ alkyl, $C_{1\text{-}12}$ aryl, or any combination thereof. Examples of disubstituted esters may include of ethyl difluoroacetate, ethyl propionate, or any combination thereof. The disubstituted ester may have the following structure:

$$R_1 \diagup \overset{\displaystyle O}{\underset{\|}{C}} \diagdown OR_1$$

where each $R_1$ may independently comprise a hydrogen atom, a $C_{1\text{-}12}$ alkyl group that may be linear or branched, a hetero-alkyl group that may be linear or branched, or any combination thereof. Both $R_1$ in combination may form a cyclic alkyl ring that may optionally include one or more hetero atoms.

Disubstituted carbonates may be substituted independently at each of the carbon atoms. Disubstituted carbonates may include dimethyl carbonate, diethyl carbonate, ethyl methyl carbonate, fluoroethylene carbonate, or any combination thereof. The disubstituted carbonate may have the following structure:

$$R_1 \diagup \overset{\displaystyle O}{\underset{\|}{C}} \diagdown O \diagup \overset{\displaystyle O}{\underset{\|}{C}} \diagdown R_1$$

where each $R_1$ may independently comprise a hydrogen atom, a $C_{1\text{-}12}$ alkyl group that may be linear or branched, a hetero-alkyl group that may be linear or branched, or any combination thereof. Both $R_1$ in combination may form a cyclic alkyl ring that may optionally include one or more hetero atoms.

Trisubstituted phosphates may be substituted at each of the single bonded oxygen atoms. Trisubstituted phosphates may include trimethyl phosphate, triethyl phosphate, or any combination thereof. The trisubstituted phosphates may have the following structure:

$$R_1O \diagup \overset{\displaystyle O}{\underset{\|}{P}} \diagup OR_1 \diagdown OR_1$$

where each $R_1$ may independently comprise a hydrogen atom, a $C_{1\text{-}12}$ alkyl group that may be linear or branched, a hetero atom, a hetero-alkyl group, or any combination thereof.

Where each $R_2$ may independently comprise a hydrogen atom, $C_{1\text{-}12}$ alkyl group that may be linear or branched, or any combination thereof.

Disubstituted sulfones may be substituted at the sulfur atom by one or more groups including hydrogen, $C_{1\text{-}12}$ alkyl, $C_{1\text{-}12}$ aryl, or any combination thereof. Disubstituted sulfones may include sulfolane, methyl ethyl sulfone, methyl isopropyl sulfone, or any combination thereof. The disubstituted sulfones may have the following structure:

$$R_1 \diagup \overset{\displaystyle O}{\underset{\|}{\overset{\|}{S}}} \diagdown R_1$$

where each $R_1$ may independently comprise a hydrogen atom, a $C_{1\text{-}12}$ alkyl group that may be linear or branched, a hetero-alkyl group that may be linear or branched, or any combination thereof. Both $R_1$ in combination may form a cyclic alkyl ring that may optionally include one or more hetero atoms.

Tetrasubstituted silanes may be substituted at the silicon atom and/or each oxygen atom. Tetrasubstituted silanes may include triethyoxymethyl silane, trimethoxymethylsilane, or any combination thereof. The tetrasubstituted silanes may have the following structure:

$$R_3 \diagdown \underset{R_3}{\overset{R_3}{Si}} \diagup R_3$$

where each $R_3$ may independently comprise a hydrogen atom, a $C_{1\text{-}12}$ alkyl group that may be linear or branched, a hetero atom, a hetero-alkyl group, $C_{1\text{-}12}$ alkoxy group that may be linear or branched, a hetero atom, a hetero-alkyl group, or any combination thereof.

The lithium salt may be any salt sufficient to be surrounded by the solvating structures of the solvating solvent and/or diluent in the electrolyte. The lithium salt may have a solubility in the solvating solvent relative a solubility in the diluent that allows for the diluent and solvating solvent to be miscible at a miscible molar ratio that has improved discharge capacity and capacity retention. For example, the lithium salt may have a solubility in the diluent above zero.

The lithium salt may have a solubility in the solvating solvent of about 1 M or more, about 3 M or more, or about 5 M or more. The lithium salt may have a solubility in the solvating solvent of about 20 M or less, about 15 M or less, or about 10 M or less. The lithium salt may be about 3 times to about 20 times, about 3 times to about 15 times, about 3 times to about 10 times, about 5 times to about 20 times, about 5 times to about 15 times, about 5 times to about 10 times, about 10 times to about 20 times, or about 10 times to about 15 times more soluble in the solvating solvent than a solubility of the diluent in the solvating solvent. The lithium salt may be saturated in the combination of the solvating solvent and the diluent at about 1 M or more, about 2 M or more, or about 5 M or more relative to the concentration of the lithium salt in the solvating solvent alone. The lithium salt may be saturated in the combination of the solvating solvent and the diluent at about 20 M or less, about 10 M or less, or about 7 M or less relative to the concentration of the lithium salt in the solvating solvent alone.

The concentration at which the lithium salt reaches the saturation point in the electrolyte may change depending on the miscible molar ratio of the diluent/solvating. For example, the lithium salt may be present in the electrolyte at a concentration of about 0.1 M or more, about 0.5 M or more, or about 1.0 M or more. The lithium salt may be present in a concentration of about 3.5 M or less, about 2.0 M or less, or about 1.5 M or less. The lithium salt and combination of diluent/solvating solvent may be present in a molar ratio of about 1:2 or more, 1:2.6 or more, or 1:3.2 or more. The lithium salt and combination of diluent/solvating solvent may be present in a molar ratio of about 1:6 or less, about 1:5 or less, or about 1:4 or less.

The electrolyte may include any number of lithium salts that in combination are dissolvable in a miscible molar ratio of diluent/solvating solvent. The electrolyte may include a single salt, or the electrolyte may include two or more, three or more, four or more, or a plurality of lithium salts.

The lithium salt may include one or more of lithium bis(oxalato) borate (LiBOB), lithium bis(pentafluoroethyl-sulfonyl)imide (Li-BETI), lithium bis(fluorosulfonyl)imide (LiFSI), lithium tetrafluoroborate (LiBF$_4$), lithium trifluoromethanesulfonate (LiTriflate), lithium hexafluoroarsenate (LiAsF$_6$), lithium bis(trifluoromethanesulfonimide) (LiTFSI), and lithium hexafluoro-phosphate (LiPF$_6$), lithium nitrate (LiNO$_3$), LiN(SO$_2$CF$_3$)$_2$, LiN(SO$_2$F)$_2$, LiCF$_3$SO$_3$, LiClO$_4$, lithium difluoro oxalate borate anion (LiDFOB), LiI, LiBr, LiCl, LiOH, and LiSO$_4$.

In some examples, another salt may be included in the electrolyte, such as another alkali metal salt, an alkaline earth metal salt, or any combination thereof. For example, the lithium salt may include a sodium salt, a magnesium salt, a mixture of lithium and sodium salts, a mixture of lithium and magnesium salts, a mixture of lithium, magnesium, and sodium salts, a mixture of sodium and magnesium salts, or any combination thereof. For example, the lithium salt may include one or more of sodium bis(fluorosulfonyl)imide (NaFSI), sodium bis(trifluoromethylsulfonyl)imide (NaTFSI), sodium bis(oxalato)borate (NaBOB), NaFSI, NaTFSI, and any lithium salt.

The battery may have a discharge capacity or capacity retention that is related to the molar ratios of the solvents and the diluents and the specific solvating solvents and/or diluents selected. For example, a structure of the diluent that includes branched or linear alkyl groups may change the discharge capacity or capacity retention. In other examples, lowering or raising the molar ratio of the diluent/solvating solvent based on miscibility of the solvents or structural considerations of the diluent may alter the discharge capacity or capacity retention. The battery may have a discharge capacity of about 120 mAh/g or more, about 140 mAh/g or more, or about 160 mAh/g or more. The battery may have a discharge capacity of about 220 mAh/g or less, about 200 mAh/g or less, or about 180 mAh/g or less. The battery may have a capacity retention at 80 percent of about 40 cycles or more, about 90 cycles or more, or about 140 cycles or more. The battery may have a capacity retention at 80 percent of about 320 cycles or less, about 270 cycles or less, or about 220 cycles or less.

The batteries are comprised of a cathode, anode, separator and electrolyte. It is understood that each of these components may be connected or contained with other common components of a battery such as current collectors coated with the anode and cathode and battery containers encompassing the battery components with electrical connection to the battery. For example, the current collector may be any suitable metal (e.g., Al, Alloys of Al and Cu and alloys of Cu) foil, sheet or the like such as a metal foil that may be further coated with an electrical conducting material such as carbon including those described by U.S. Pat. No. 9,172,085, incorporated herein by reference.

The cathode may include any material sufficient to have desirable discharge capacity and charge retention when used with an anode and localized high concentration electrolyte. Examples of suitable cathode materials may include phosphates, fluorophosphates, fluorosulfates, fluorosilicates, spinels, lithium-rich layered oxides, and composite layered oxides. Further examples of suitable cathode materials may include spinel structure lithium metal oxides, layered structure lithium metal oxides, lithium-rich layered structured lithium metal oxides, lithium metal silicates, lithium metal phosphates, metal fluorides, metal oxides, sulfur, metal sulfides, disordered rock salt structures, or any combination thereof.

The electrode prepared from the cathode active material may further include other cathode components such as binders and electrically conducting additives. The binder may be any suitable such as those known in the art and may include, for example, carboxy methyl cellulose (CMC), styrene-butadiene rubber (SBR), polyvinylidene fluoride (PVDF), poly-tetrafluoroethylene (PTFE), or a mixture of two or more thereof. Desirably, the binder is comprised of PVDF. The electrically conducting additive may include graphite, carbon black, carbon nanotubes, graphene and carbon fiber.

The amount of other cathode components may be any suitable amount, but generally is at most about 20% or 10% by weight to about 0.1%, 0.5% or 1% by weight of the cathode (i.e., lithium metal phosphate and other cathode components).

The anode may include any material sufficient to function as an anode with the selected cathode and localized high concentration electrolyte. The anode may include one or more of graphite, lithium, lithium alloy, silicon, and a silicon alloy. Where the anode is a lithium alloy or lithium metal, the electrolyte may be formulated such that formation of additional lithium surface area or lithium dendrites is reduced as the battery is cycled. Examples of suitable anode materials may include conventional anode materials used in lithium ion batteries, such as lithium, graphite ("Li$_x$C$_6$"), and other carbon, silicon, or oxide-based anode materials.

In some examples, the anode may be graphite. Graphitic carbon may be any carbon capable of intercalating lithium with it being understood that carbons exhibiting short range order, but limited long range order that appear amorphous by X-ray diffraction may be used. The graphitic carbon, illustratively, may be synthetic or natural graphite having sufficient purity for use in lithium ion batteries, which typically requires a purity of at least about 99.5%, 99.9 or 99.95%. Illustratively, the graphitic carbon may be a spherical graphite, with it being understood that such graphite is not perfectly spherical but may be ovoid in nature, but are not flakes. The spherical graphite, generally, has a high purity such as at least 99.95% pure, but may also be comprised of a small amount of oxides such as silica, titania and zirconia or other materials capable of intercalating lithium but these are present in an amount of less than 5% or 1% by volume of the cathode. The spherical graphite may be from artificial graphite or purified natural graphite. Examples of useful spherical graphites are described in U.S. Pat. Pub. 2016/0141603 and U.S. Pat. No. 9,276,257, each incorporated herein by reference. Examples of suitable commercially available spherical graphites include those available from Syrah Resources, Magnis Resources, Northern Graphite, Focus Graphite and Graphite One.

Enumerated Embodiments

The following embodiments are intended to be illustrative and do not unduly limit the scope of the disclosure.

Embodiment 1. A battery comprising an electrolyte comprised of a solvating solvent, diluent and a lithium salt, the electrolyte being a solution having a saturation point, the lithium salt being at least 5 times more soluble in the solvating solvent than in the diluent, the diluent and the solvating solvent are immiscible at a molar ratio of diluent/solvating solvent of 2 or more and the solvating solvent and diluent are present in the electrolyte at a diluent/solvating solvent molar ratio of 0.1 to less than 2.

Embodiment 2. The battery of embodiment 1, wherein the lithium salt is less than 10 times more soluble in the solvating solvent.

Embodiment 3. A battery comprising an electrolyte comprised of a solvating solvent, diluent and a lithium salt, the electrolyte being a solution having a saturation point, the lithium salt being at least 5 times more soluble to less than 10 times more soluble in the solvating solvent than in the diluent, and the solvating solvent and diluent are present in the electrolyte at a diluent/solvating solvent molar ratio of 0.1 to less than 5.

Embodiment 4. The battery of any one of the preceding embodiments, wherein the diluent has a miscibility point in the solvating solvent and the lithium salt has a saturation point in the solvating solvent such that the saturation point of the lithium salt in the solvating solvent is at least 5 times greater than the miscibility point diluent in the solvating solvent.

Embodiment 5. The battery of any one of the preceding embodiments, wherein the saturation point/miscibility point is from 5 to 10.

Embodiment 6. The battery of any one of the preceding embodiments, wherein the diluent and the solvating solvent are present in a molar ratio of 0.5 to 1.8.

Embodiment 7. The battery of any one of the preceding embodiments, wherein the diluent and the solvating solvent are present in a molar ratio of 0.8 to 1.5.

Embodiment 8. The battery of any one of the preceding embodiments, wherein the lithium salt and the combination of the solvating solvent and the diluent are present in a molar ratio 1:2 or more.

Embodiment 9. The battery of any one of the preceding embodiments, wherein the lithium salt is present in a molar concentration of about 0.5 M to about 3 M.

Embodiment 10. The battery of any one of the preceding embodiments, wherein the lithium salt is present in an amount 20 percent below the saturation point of the solution.

Embodiment 11. The battery of embodiment 10, wherein the amount of lithium salt in the solution is in excess of the saturation point of the solvating solvent present in the solution.

Embodiment 12. A battery, comprising an electrolyte comprised of:
a lithium salt;
a solvating solvent that dissolves the lithium salt; and
a diluent that is miscible with the solvating solvent,
wherein the lithium salt is at least 5 times more soluble in the solvating solvent than a miscibility of the diluent in the solvating solvent, and
wherein the solvating solvent and diluent are present in the battery at a battery diluent ratio/solvating solvent ratio of 0.1 to less than 3.0.

Embodiment 13. The battery of embodiment 12, wherein the diluent and the solvating solvent are present in a molar ratio of 0.5 to 3.0.

Embodiment 14. The battery of embodiment 14, wherein the diluent and the solvating solvent are present in a molar ratio of 1.0 to 3.0.

Embodiment 15. The battery of any one of the preceding embodiments, wherein the lithium salt is at least 5 times to 10 times more soluble in the solvating solvent than a miscibility of the diluent in the solvating solvent.

Embodiment 16. The battery of any one of the preceding embodiments, further comprising an anode.

Embodiment 17. The battery of embodiment 17, wherein the anode comprises one or more of graphite, lithium, lithium alloy, silicon, and a silicon alloy.

Embodiment 18. The battery of embodiments 17 or 18, wherein the anode comprises lithium or a lithium alloy.

Embodiment 19. The battery of any one of the preceding embodiments, wherein concentrations of lithium salt and diluent is within about 20 percent of phase separation in the electrolyte.

Embodiment 20. The battery of embodiments of any one of the preceding embodiments, wherein the diluent comprises a fluorinated ether.

Embodiment 21. The battery of embodiment 20, wherein the fluorinated ether comprises an n-butyl group or an isobutyl group.

Embodiment 22. The battery of embodiment 20, wherein the fluorinated ether comprises one or more of 1,1,2,2-tetrafluoroethyl 2,2,3,3-tetrafluoropropyl ether; bis(2,2,2-trifluoroethyl) ether, hexafluoroisopropyl methyl ether; 1,1,2,2-tetrafluoroethyl ethyl ether; 1H,1H,5H-octafluoropentyl 1,1,2,2,-tetrafluoroethyl ether; 1,1,2,2-tetrafluoroethyl ether, 1,2-(1,1,2,2,-tetrafluoroethoxy) ethane; 1,3-(1,1,2,2-Tetrafluoroethoxy) propane, 1,1,2,3,3,3-hexafluoro propyl 2,2,2-trifluoroethyl ether; n-butyl 1,1,2,2-tetrafluoroethyl ether; 1H,1H,2'H,3H-decafluoro dipropyl ether; 1,1,2,3,3,3-hexafluoropropyl ethyl ether; 1,1,1-trifluoro-2-[1-(2,2,2-trifluoroethoxy)ethoxy] ethane; 1H,1H,2'H-perfluorodipropyl ether, 1,1,2,2-tetrafluoroethyl isobutyl ether; 1,1,1,2,2,3,4,5,5,5-decafluoro-2-methoxy-4-(trifluoromethyl) pentane; 1-(ethoxy) nonafluorobutane having a mixture of n- and iso-butyl isomers; 2-(trifluormethyl)-3-ethoxydodecafluoro-hexane; 3-methoxyperfluoro(2-methylpentane); heptafluoropropyl 1,2,2,2-tetrafluoroethyl ether; 1,1,2,2-tetrafluoro-ethyl-2,2,2-trifluoroethyl ether; methoxynonafluorobutane;

ethoxynonafluorobutane; tris(2,2,2-trifluroethyl)orthoformate; and di(2,2,2-trifluroethyl) carbonate.

Embodiment 23. The battery of embodiment 20, wherein the diluent comprises a fluorinated ether comprising one or more of hexafluoroisopropyl methyl ether; 1,1,2,2-tetrafluoroethyl ethyl ether; 1H,1H,5H-octafluoropentyl 1,1,2,2,-tetrafluoroethyl ether; 1,2-(1,1,2,2,-tetrafluoroethoxy) ethane; 1,3-(1,1,2,2-Tetrafluoroethoxy) propane; 1,1,2,3,3,3-hexafluoro propyl 2,2,2-trifluoroethyl ether; n-butyl 1,1,2,2-tetrafluoroethyl ether; 1,1,2,2-tetrafluoroethyl isobutyl ether; and 1H,1H,2'H,3H-decafluoro dipropyl ether.

Embodiment 24. The battery of embodiment 20, wherein the fluorinated ether comprises one or more of 1H,1H,2'H-perfluorodipropyl ether, 1,1,2,2-tetrafluoroethyl isobutyl ether; 1,1,1,2,2,3,4,5,5,5-decafluoro-2-methoxy-4-(trifluoromethyl) pentane; 1-(ethoxy) nonafluorobutane having a mixture of n- and iso-butyl isomers; 2-(trifluormethyl)-3-ethoxydodecafluorohexane; 3-methoxyperfluoro(2-methylpentane); and heptafluoropropyl 1,2,2,2-tetrafluoroethyl ether.

Embodiment 25. The battery of any one of the preceding embodiments, wherein the lithium salt comprises one or more of lithium bis(oxalato) borate (LiBOB), lithium bis(pentafluoroethylsulfonyl)imide (Li-BETI), lithium bis(fluorosulfonyl)imide (LiFSI), lithium tetrafluoroborate (LiBF$_4$), lithium trifluoromethanesulfonate (LiTriflate), lithium hexafluoroarsenate (LiAsF$_6$), lithium bis(trifluoromethanesulfonimide) (LiTFSI), and lithium hexafluorophosphate (LiPF$_6$), lithium nitrate (LiNO$_3$), LiN(SO$_2$CF$_3$)$_2$, LiN(SO$_2$F)$_2$, LiCF$_3$SO$_3$, LiClO$_4$, lithium difluoro 20xalate borate anion (LiDFOB), LiI, LiBr, LiCl, LiOH, and LiSO$_4$.

Embodiment 26. The battery of any one of the preceding embodiments, wherein the solvating solvent comprises one or more dialkoxy alkanes, dialkyl glycol ethers, disubstituted esters, disubstituted carbonates, trisubstituted phosphates, disubstituted sulfones, and tetrasubstituted silanes.

Embodiment 27. The battery of any one of the preceding embodiments, wherein the battery has a capacity retention of 80 percent at 160 cycles or more.

Embodiment 28. The battery of any one of the preceding embodiments, wherein the battery has a capacity retention of 80 percent at 180 cycles or more.

Embodiment 29. The battery of any one of the preceding embodiments, wherein the battery has a capacity of about 150 mAh/g or more.

Embodiment 30. The battery of any one of the preceding embodiments, wherein the battery has a capacity of about 180 mAh/g or more.

Embodiment 31. The battery of any one of the preceding embodiments, further comprising a cathode.

Embodiment 32. The battery of embodiment 31, wherein the cathode comprises one or more of a phosphates, fluorophosphates, fluorosulfates, fluorosilicates, spinels, lithium-rich layered oxides, and disordered rocksalts.

Embodiment 33. The battery of any one of the preceding embodiments, further comprising a separator.

Embodiment 34. The battery of embodiment 33, wherein the separator comprises one or more of nonwoven fibers, microporous films, and ceramics.

Embodiment 35. A method of forming an electrolyte comprising, a. dissolving a lithium salt in a solvating solvent to form a solvating solvent-lithium salt solution b. dissolving a diluent in the solvating solvent-lithium salt solution, and c. further dissolving more lithium salt to a concentration that exceeds an amount of the lithium salt soluble in the solvating solvent present to form the electrolyte.

Embodiment 36. The method of embodiment 35, wherein the lithium salt in the electrolyte is below a saturation point of the lithium salt in the electrolyte.

Embodiment 37. An electrolyte comprised of a solvating solvent, diluent, and a lithium salt, the electrolyte being a solution having a saturation point, the solvating solvent having a saturation point, and the lithium salt being at least 5 times more soluble in the solvating solvent than in the diluent, wherein the lithium salt is present in an amount below the saturation point of the electrolyte and above the saturation point of the solvating solvent if present in the absence of the diluent.

EXAMPLES

The follow examples are intended to be illustrative and do not unduly limit the scope of the disclosure.

Example 1

In Example 1, battery cells are formed in a high purity Argon filled glove box (M-Braun, O$_2$ and humidity content <0.1 ppm). For the cathode, a commercial high Ni NMC (Ni content ≥80%, referred to herein as NMC811)) active material is mixed with polyvinylidene fluoride (PVDF), carbon black powder, and liquid 1-methyl-2-pyrolidinone (NMP) to form a slurry. The resulting slurry is deposited on an aluminum current collector and dried to form a composite cathode film. For the anode, commercially available 40 μm thickness of lithium foil coated on the copper current collector is used. Each battery cell includes the composite cathode film, a polypropylene separator, and thin lithium anode foil. The localized high salt concentration electrolyte was prepared by mol ratio. For example, Lithium bis(fluorosulfonyl)imide (LiFSI), dimetoxyethane, and 1,2-(1,1,2,2,-tetrafluoroethoxy) ethane (TFEE) are mixed by 1/1.2/3 mol ratio. A lean electrolyte amount was added for battery cell cycling. The battery cell is then sealed and initially cycled at ambient temperature using 0.1 C charge to upper cutoff voltage 4.3V followed by constant voltage hold until the current drops to 0.05 C and then discharges to 2.7V using 0.1 C constant current. The cycle is repeated one more times prior to be cycled at 0.33 C/0.33 for subsequent cycles.

Figure 1B:
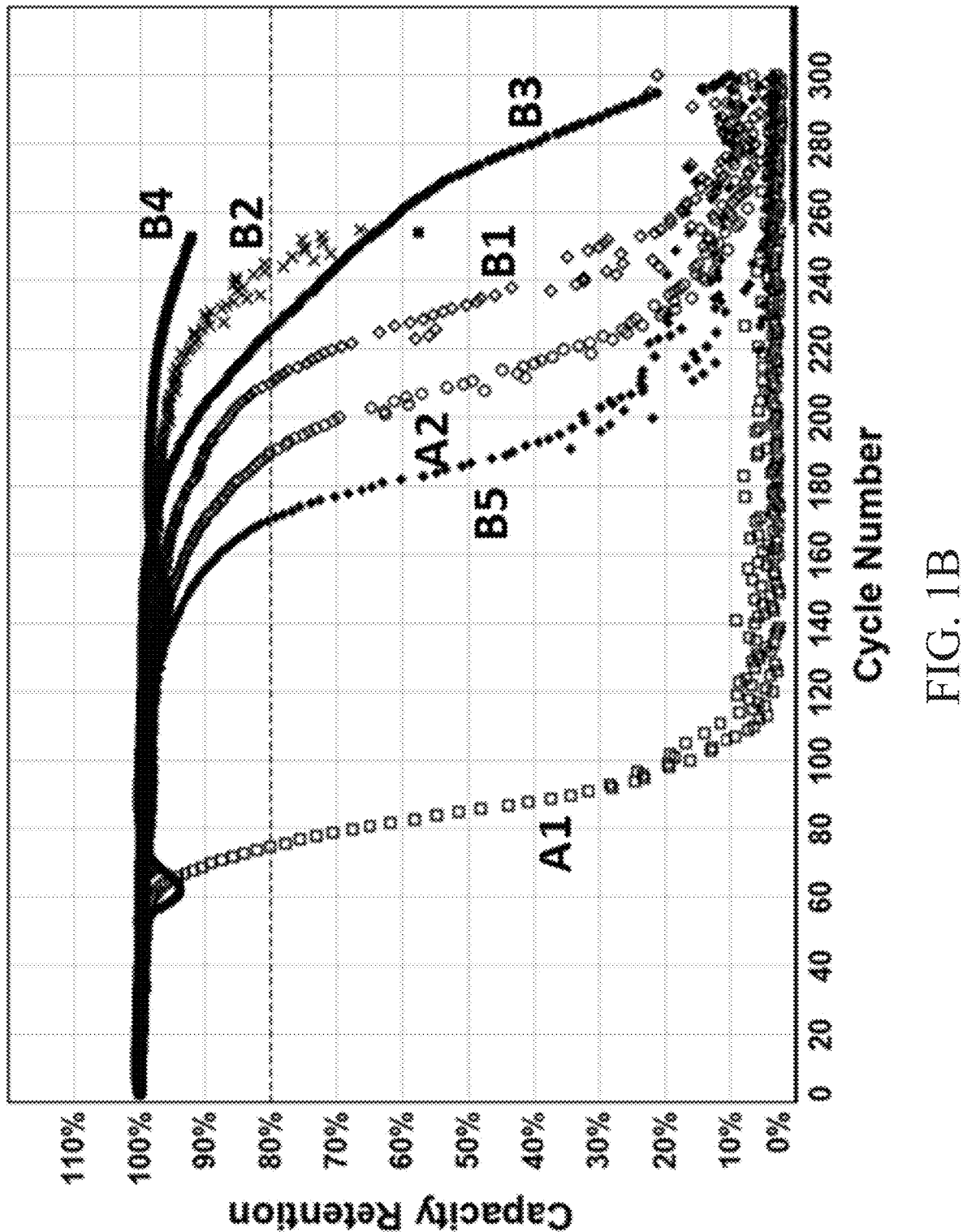
Figure 2A:
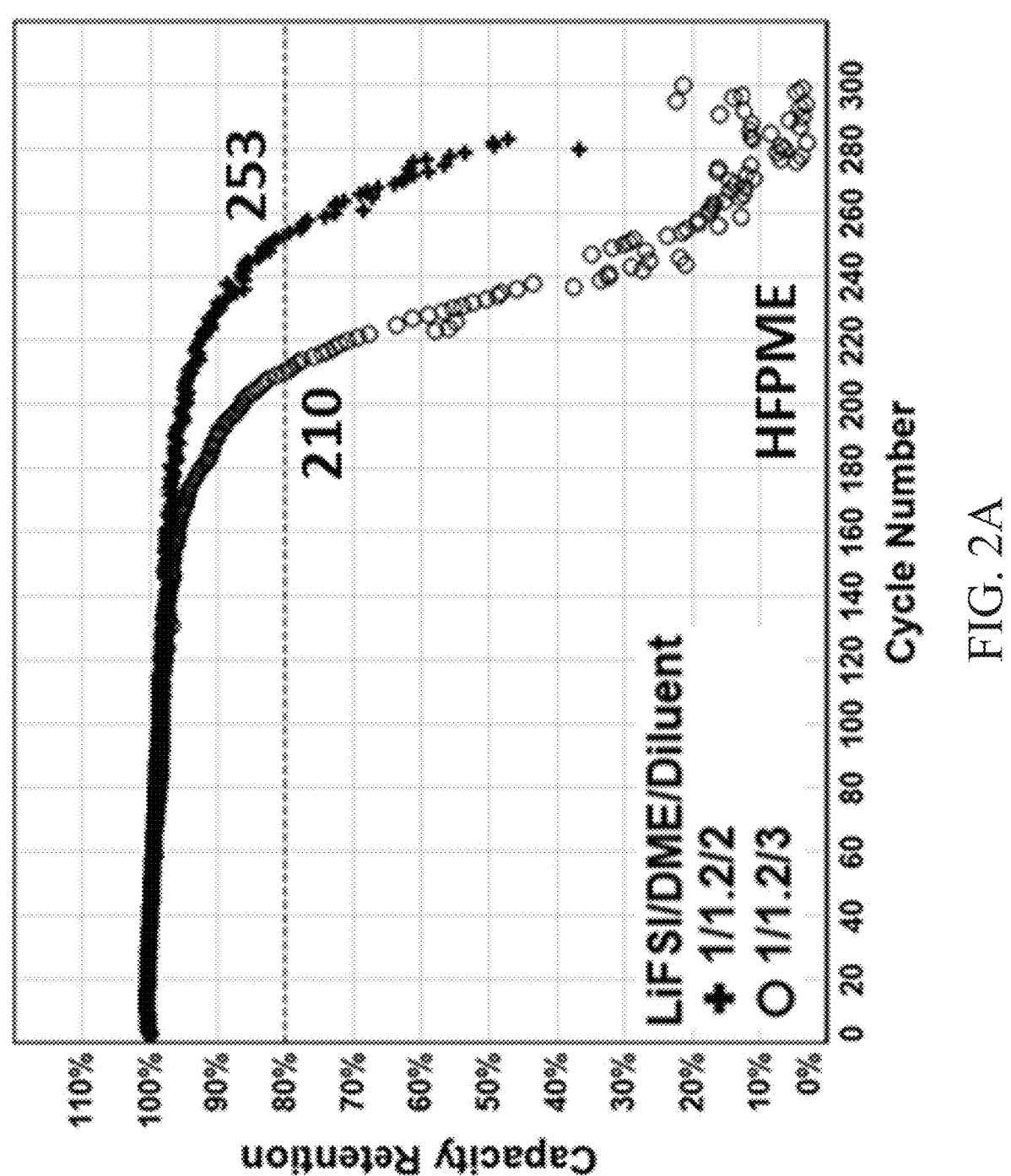
FIGS. 2A-2E illustrate capacity retention of five different diluents at different molar ratios with the solvating solvent DME.
Figure 2B:
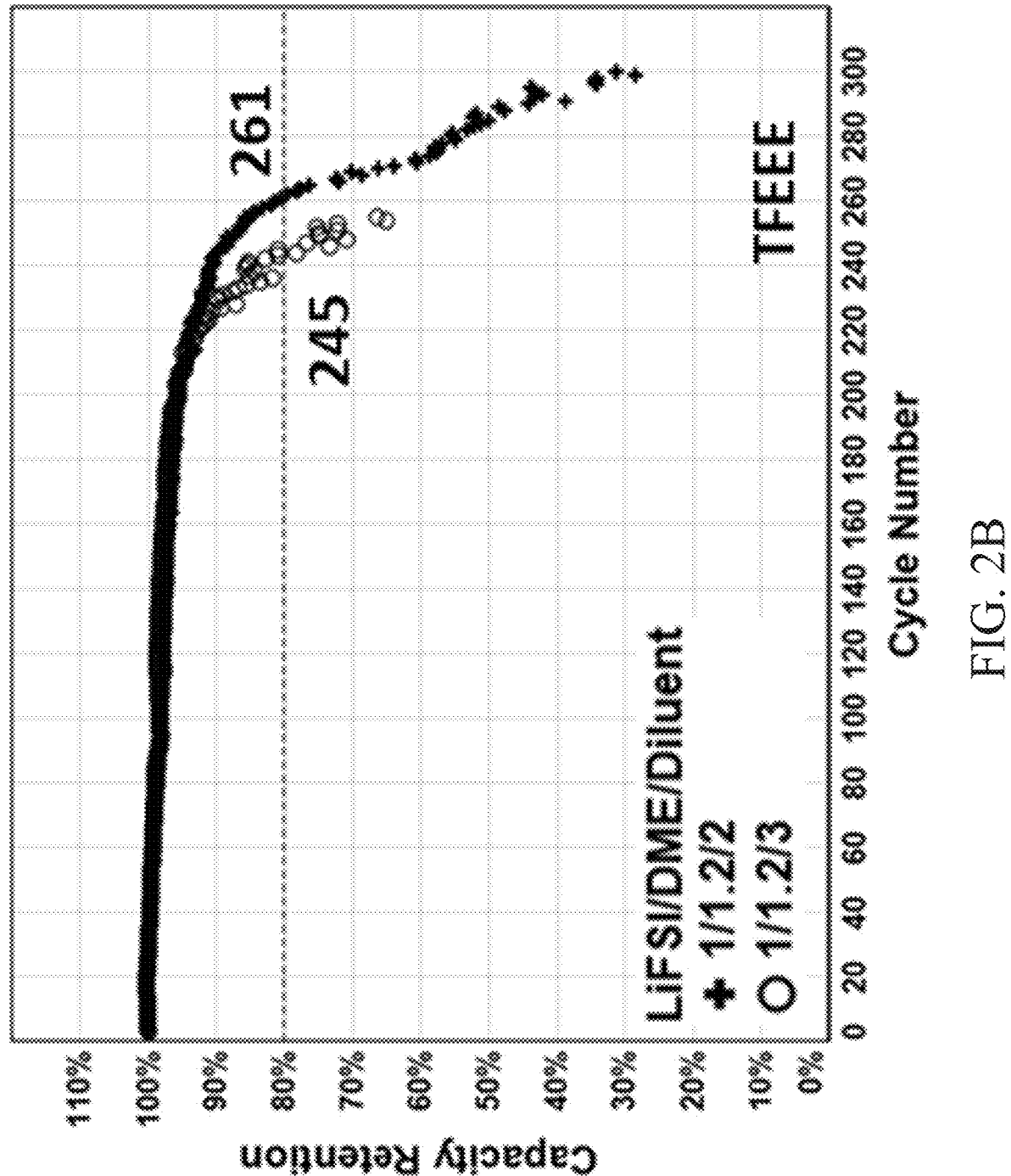
Figure 2C:
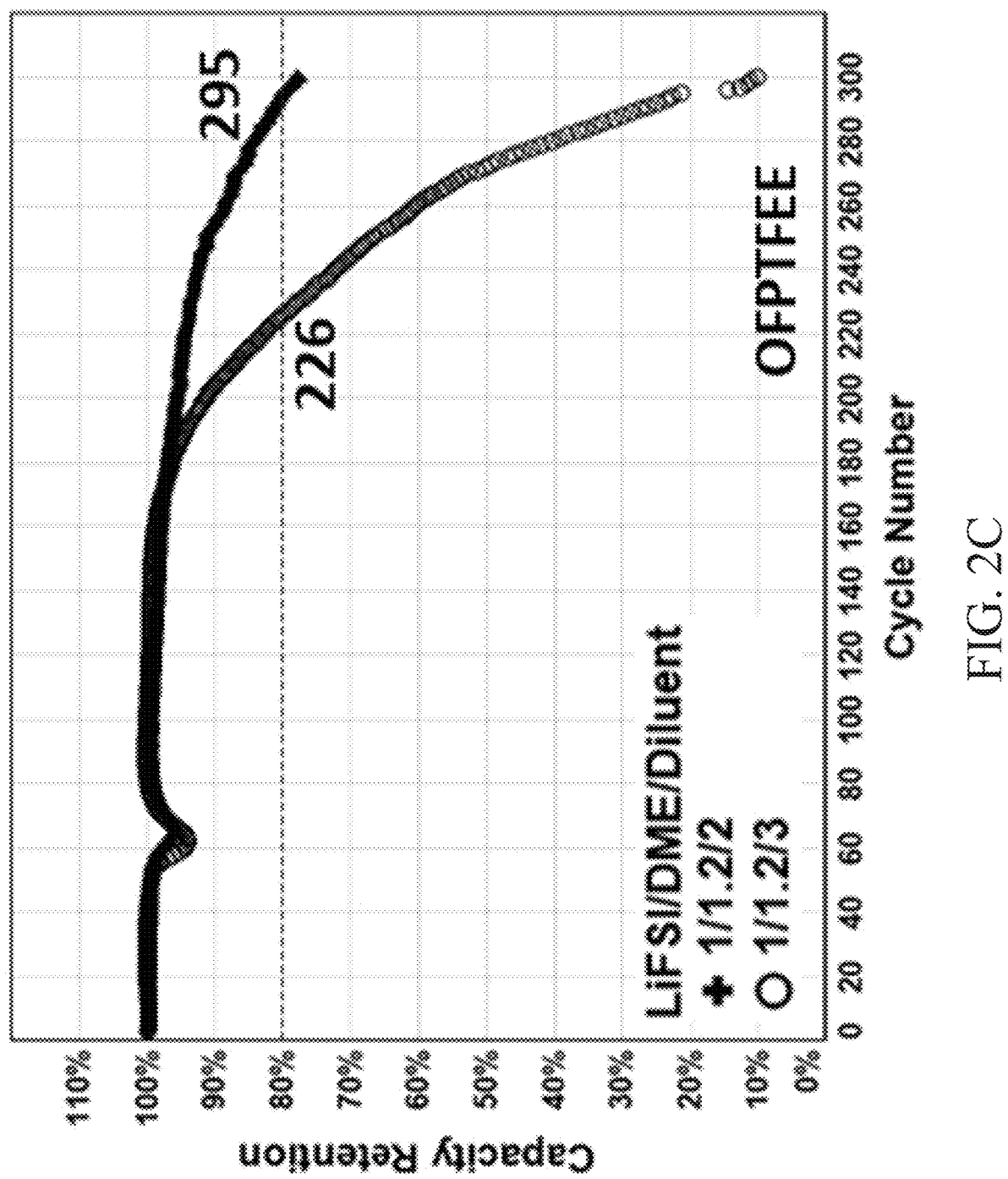
Figure 2D:
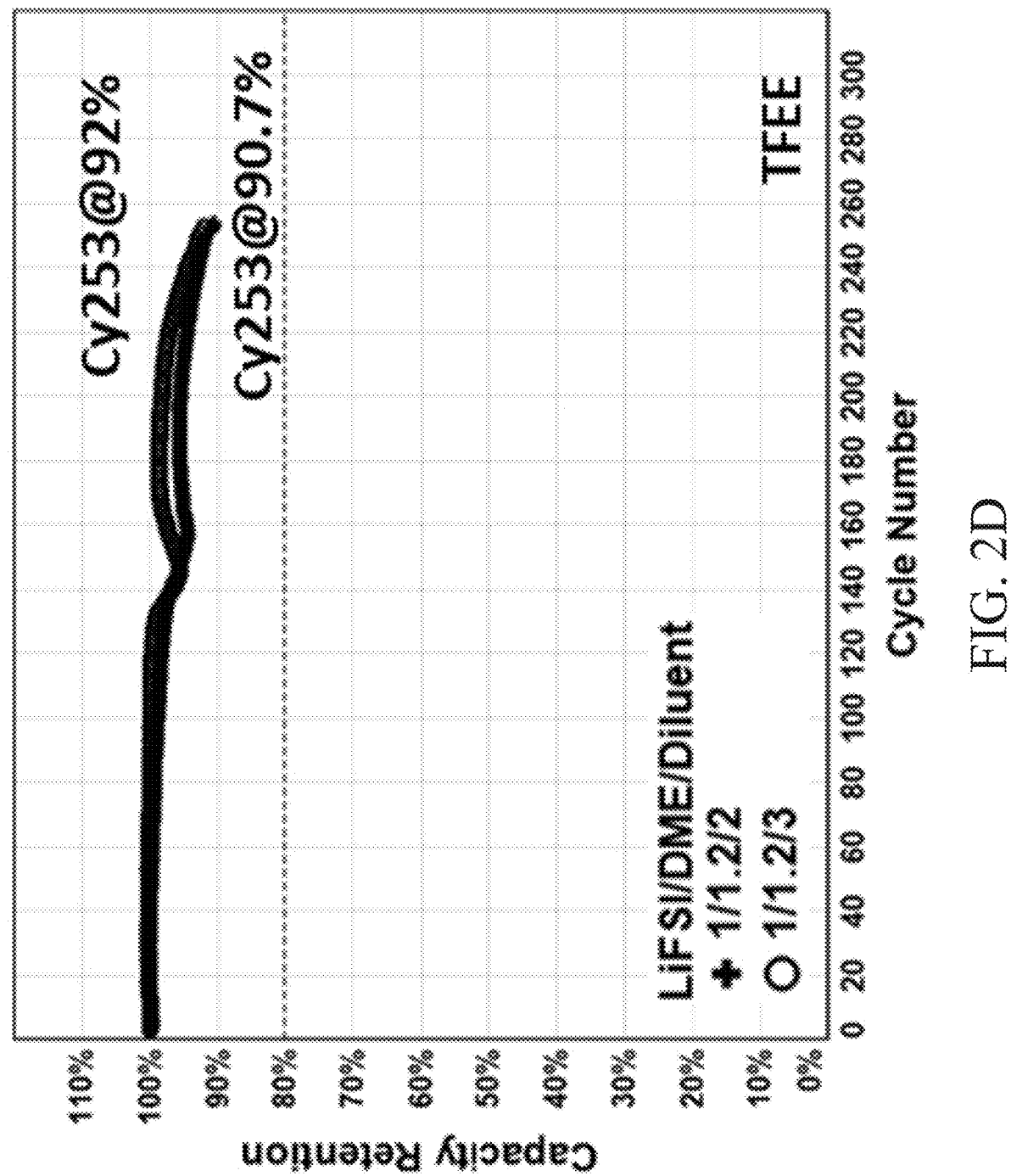
Figure 2E:
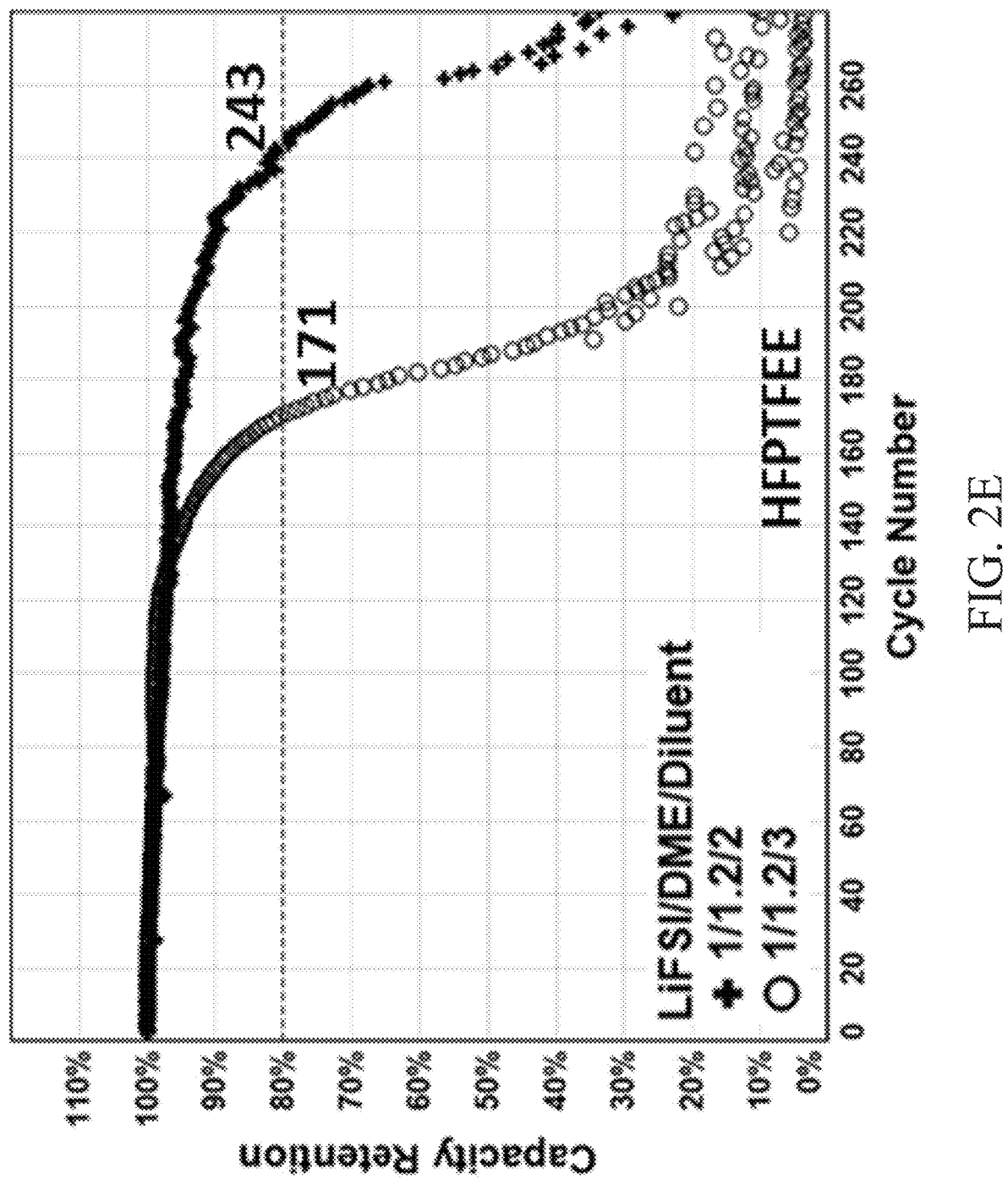

FIGS. 1A-1B illustrate the discharge capacity and capacity retention of five different diluents is compared against BTFE and TTE. The diluents include the following:

Bis(2,2,2-trifluoroethyl) ether (BTFE)

1,1,2,2-Tetrafluoroethyl 2,2,3,3-Tetrafluoropropyl Ether (TTE)

hexafluoroisopropyl methyl ether (HFPME)

1,1,2,2-tetrafluoroethyl ethyl ether (TFEEE)

-continued 1H,1H,5H-Octafluoropentyl 1,1,2,2-
Tetrafluoroethyl Ether (OFPTFEE)

1,2-(1,1,2,2-Tetrafluoroethoxy)
Ethane (TFEE)

1,1,2,3,3,3-Hexafluoro propyl
2,2,2trifluoroethyl ether (HFPTFEE)

The components are in assembled in a molar ratio of the LiFSI/DME/diluent of 1/1.2/3. BTFE and TTE are Comparative Examples $A_1$ and $A_2$. HFPME, TFEEE, OFPTFEE, TFEE, and HFPTFEE are Examples $B_1$, $B_2$, $B_3$, $B_4$, and $B_5$.

Four diluents including HFPME, TFEEE, OFPTFEE, and TFEE showed improved performance over TTE and BTFE.

Example 2

In Example 2, the battery is set up in the same way as Example 1. In Example 2, the molar ratios of the lithium salt, diluent, and solvating solvent are changed, as described below.

FIGS. 2A-2E illustrates capacity retention of five different diluents at different molar ratios. The molar ratios of LiFSI/DME/diluent are 1/1.2/2 instead of 1/1.2/3. Compared to Example 1, the diluents of FIG. 2 show improved performance for HFPME, TFEEE, OFPTFEE, and HFPTFEE. TFEE generally showed similar performance when the molar ratio is lowered from 1/1.2/3 to 1/1.2/2.

Example 3

For Example 3, the battery is set up in the same way as Example 1.

Table 1 illustrates the solubility of eleven diluents when mixed with dimethoxy ethane/LiFSI salt. The molar ratios of the components are 1 to 1.2 for the LiFSI salt in DME, while the molar ratio of the diluent is varied as shown. As seen from Table 1, the solubility depends upon both the structure of the diluting solvent and the molar ratio. For example, the minor change of the structure, for example DFDPE compared to PFDPE and BTFEE compared to TFEBE, can cause very different solubility.

TABLE 1

| LiFSI/DME/Diluting Solvent = 1/1.2/Y by mol | | Y Value and Observation | | |
| --- | --- | --- | --- | --- |
| 1,1,1-Trifluoro-2-[1-(2,2,2- | Y = 3, | No solubility issue | | |
| trifluoroethoxy)ethoxy]ethane (B6__TTFEEE) | 1 layer | even Y = 3 | | |
| n-Butyl 1,1,2,2-tetrafluoroethyl | Y = 3, | | | |
| ether (B7__BTFEE) | 1 layer | | | |
| 1H,1H,2'H,3H-Decafluorodipropyl | Y = 3, | | | |
| ether (B8__DFDPE) | 1 layer | | | |
| 1,1,2,3,3,3-Hexafluoropropyl | Y = 3, | | | |
| ethyl ether (B9__HFPEE) | 1 layer | | | |
| 1H,1H,2'H-Perfluorodipropyl | Y = 1, | Y = 1.5, | Y = 1.6, | |
| ether (B10__PFDPE) | 1 layer | 1 layer | murky | |
| 1,1,2,2-Tetrafluoroethyl | Y = 1, | Y = 1.4, | Y = 1.5, | |
| isobutyl ether (B11__TFEBE) | 1 layer | 1 layer | 2 layers | |
| 1,1,1,2,2,3,4,5,5,5-Decafluoro- | Y = 0.7, | All have solubility issue even | | |
| 3-methoxy-4- | 2 layers | with small Y value. The | | |
| (trifluoromethyl)pentane | | diluent could not be | | |
| 1-(Ethoxy)nonafluorobutanes, | Y = 0.7, | used for battery test | | |
| mixture of n- and iso- | 2 layers | | | |
| butyl isomers | | | | |
| 2-(Trifluoromethyl)-3- | Y = 0.5, | | | |
| ethoxydodecafluorohexane | 2 layers | | | |
| 3-Methoxyperfluoro(2- | Y = 0.6, | | | |
| methylpentane) | 2 layers | | | |
| Heptafluoropropyl 1,2,2,2- | Y = 0.7, | | | |
| tetrafluoroethyl ether | 2 layers | | | |

Figure 3A:
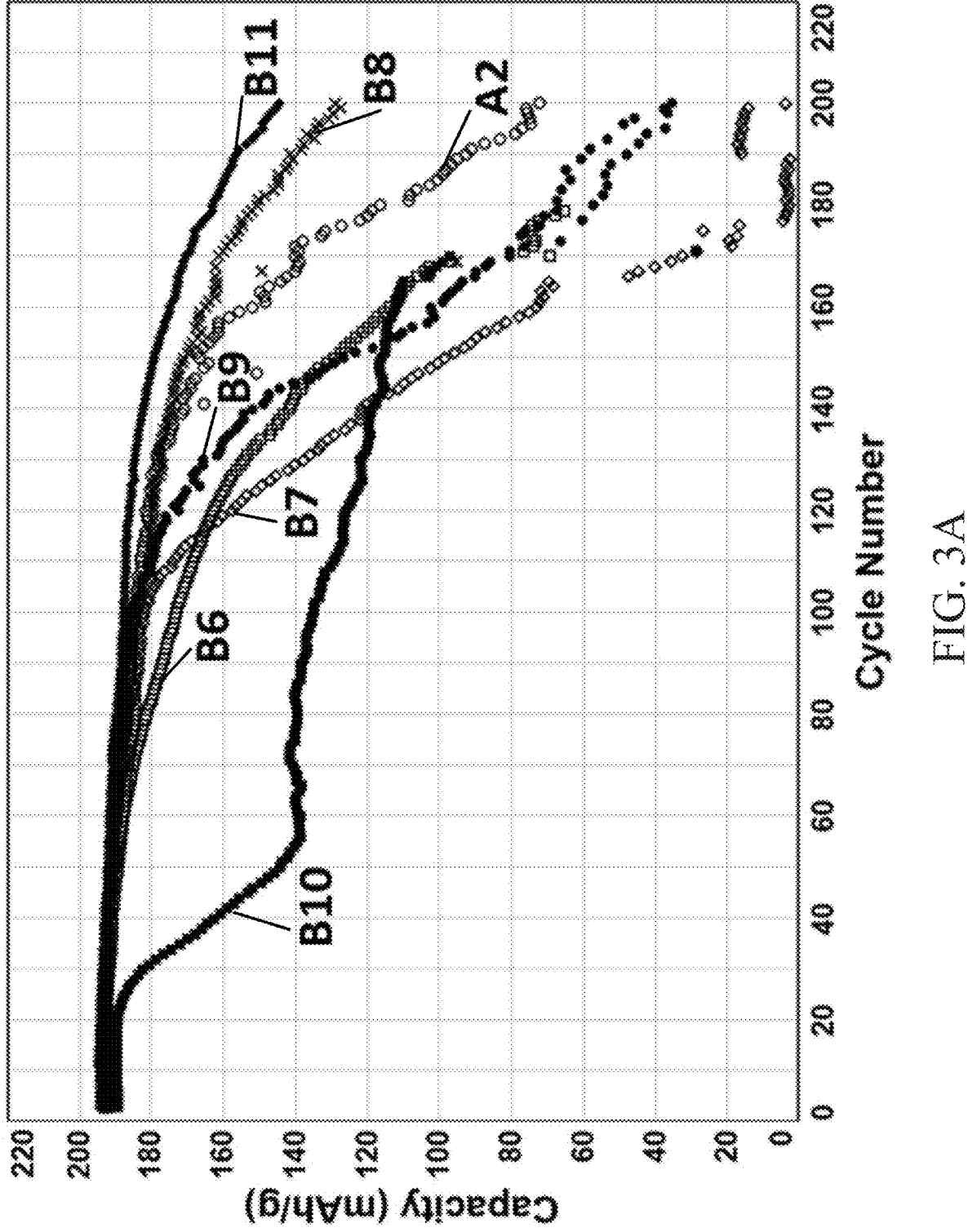
FIGS. 3A-3B illustrate the capacity retention of different diluents where the diluent and solvating solvent are miscible.
Figure 3B:
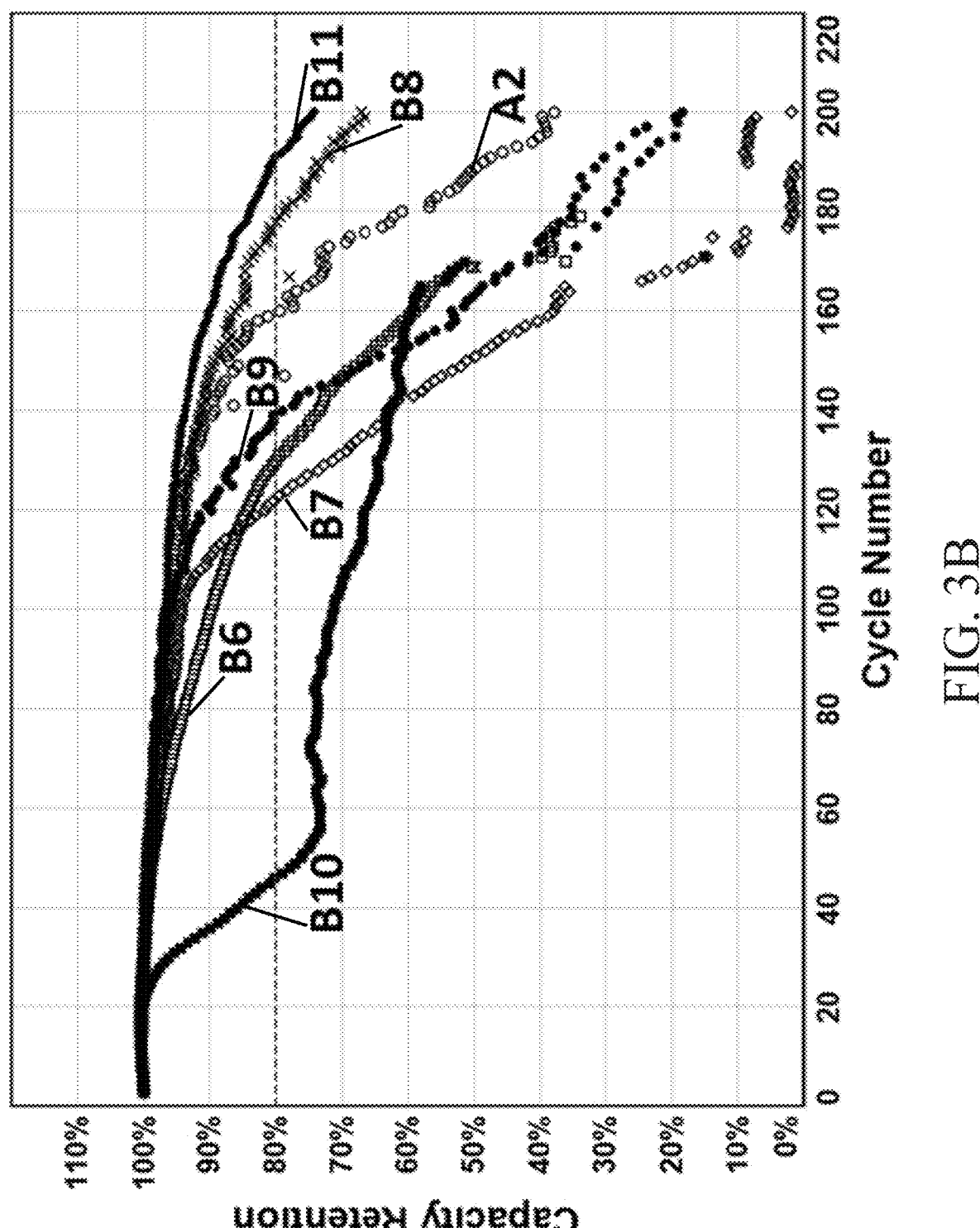

FIGS. 3A-3B illustrate the capacity retention of different diluents where the diluent and solvating solvent are miscible (1 layer as showed in Table 1). As seen from FIG. 3, electrolytes containing a lower molar ratio of the TFEBE diluent have desirable capacity retention above the other tested diluents, which indicates that different diluents with different structures and molar ratios can have good capacity retention and discharge capacity.

Example 4

For Example 4, the battery is set up the same as Example 1 except that a 20 μm Li foil coated on copper current collector is used instead of 40 μm.

Figure 4:
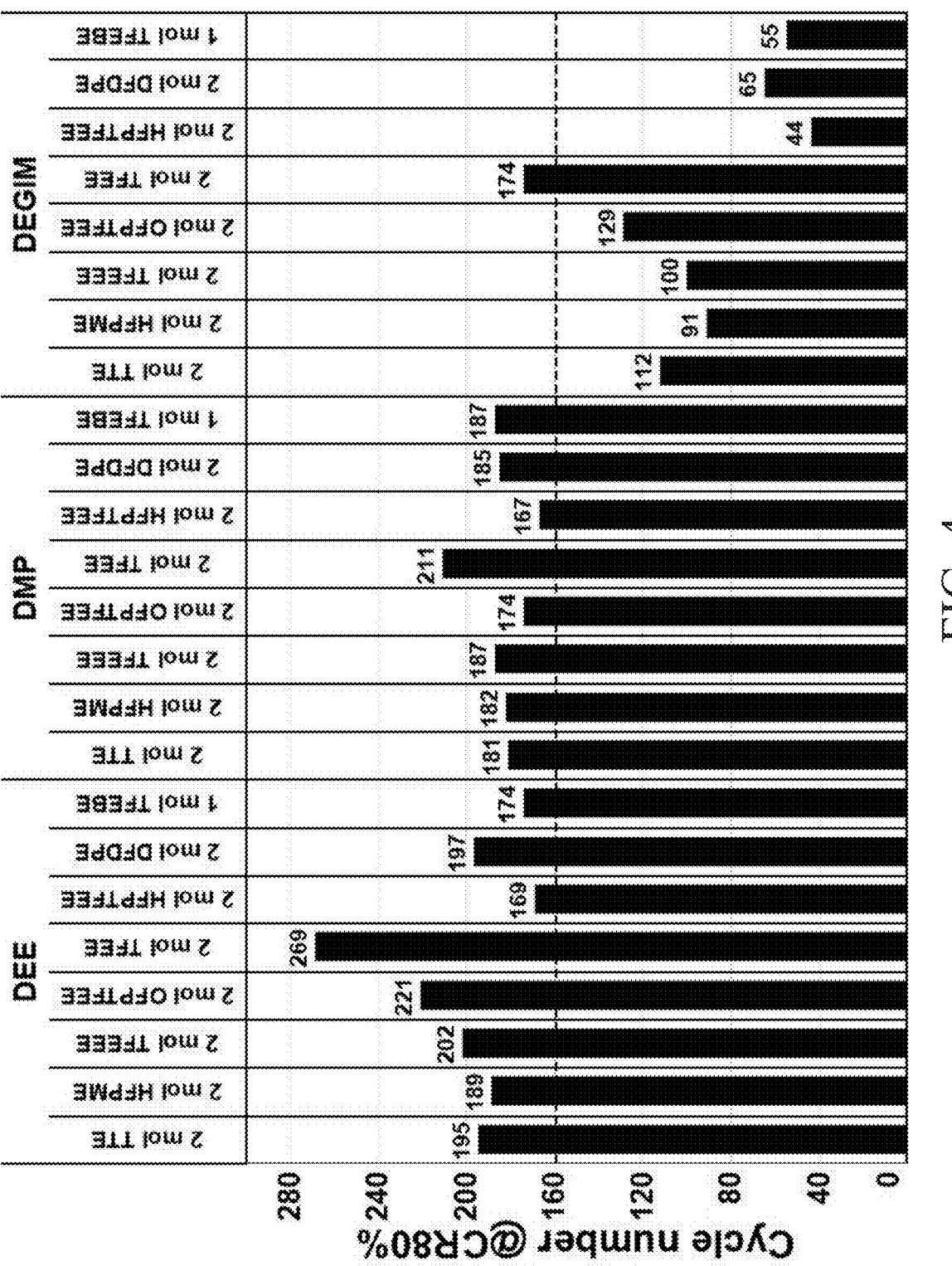
FIG. 4 illustrates the cycle number at 80% of the discharge capacity for three solvating solvents combined with varying diluents.

FIG. 4 illustrates the cycle number at 80% of the discharge capacity for three solvating solvents. The three solvating solvents include diethoxy ethane (DEE), dimethoxy propane (DMP), and diethylene glycol isopropyl methyl ether (DEGIM). As shown in FIG. 4, the DEE and DMP have a capacity retention at 80 percent of over 160 cycles, which is better than other tests using DME (a dashline in the FIG. 4 is the cycle life for LiFSI/DME/TTE=1/1.2/3 by mol).

What is claimed is:

1. A battery comprising an electrolyte comprised of a solvating solvent, diluent and a lithium salt, the electrolyte being a solution having a saturation point, the lithium salt being at least 5 times more soluble in the solvating solvent than the diluent, the diluent and the solvating solvent are immiscible at a molar ratio of diluent/solvating solvent of 2 or more and the solvating solvent and diluent are present in the electrolyte at a diluent/solvating solvent molar ratio of 0.1 to less than 2.

2. The battery of claim 1, wherein the lithium salt is less than 10 times more soluble in the solvating solvent.

3. The battery of claim 1, wherein the diluent has a miscibility point in the solvating solvent and the salt has a saturation point in the solvating solvent such that the saturation point is at least 5 times greater than the miscibility point.

4. The battery of claim 3, wherein the saturation point/the miscibility point is from 5 to 10.

5. The battery of claim 3, wherein the diluent and the solvating solvent are present in a molar ratio of diluent/solvating solvent of 0.5 to 1.8.

6. The battery of claim 5, wherein the diluent and the solvating solvent are present in a molar ratio of diluent/solvating solvent of 0.8 to 1.5.

7. The battery of claim 1, wherein the lithium salt is present in a molar concentration of about 0.5 M to about 3 M.

8. The battery of claim 1, wherein the lithium salt is present in an amount from 20 percent below to the saturation point of the solution.

9. The battery of claim 8, wherein the amount of lithium salt in the solution is in excess of the saturation point of the solvating solvent present in the solution.

10. The battery of claim 1, wherein the diluent comprises a fluorinated ether.

11. The battery of claim 10, wherein the fluorinated ether comprises an n-butyl group or an isobutyl group.

12. The battery of claim 11, wherein the solvating solvent comprises one or more dialkoxy alkanes, dialkyl glycol ethers, disubstituted esters, trisubstituted phosphates, disubstituted sulfones, and tetrasubstituted silanes.

13. The battery of claim 10, wherein the fluorinated ether comprises one or more of 1,1,2,2-tetrafluoroethyl 2,2,3,3-tetrafluoropropyl ether; bis(2,2,2-trifluoroethyl) ether, hexafluoroisopropyl methyl ether; 1,1,2,2-tetrafluoroethyl ethyl ether; 1H, 1H,5H-octafluoropentyl 1,1,2,2,-tetrafluoroethyl ether; 1,1,2,2-tetrafluoroethyl ether, 1,2-(1,1,2,2,-tetrafluoroethoxy) ethane; 1,3-(1,1,2,2-Tetrafluoroethoxy) propane, 1,1,2,3,3,3-hexafluoro propyl 2,2,2-trifluoroethyl ether; n-butyl 1,1,2,2-tetrafluoroethyl ether; 1H, 1H,2'H,3H-decafluoro dipropyl ether; 1,1,2,3,3,3-hexafluoropropyl ethyl ether; 1,1,1-trifluoro-2-[1-(2,2,2-trifluoroethoxy) ethoxy] ethane; 1H, 1H,2'H-perfluorodipropyl ether, 1,1,2,2-tetrafluoroethyl isobutyl ether; 1,1,1,2,2,3,4,5,5,5-decafluro-2-methoxy-4-(trifluoromethyl) pentane; 1-(ethoxy) nonafluorobutane having a mixture of n- and iso-butyl isomers; 2-(trifluormethyl)-3-ethoxydodecafluorohexane; 3-methoxyperfluoro(2-methylpentane); heptafluoropropyl 1,2,2,2-tetrafluoroethyl ether; 1,1,2,2-tetrafluoroethyl-2,2,2-trifluoroethyl ether; methoxynonafluorobutane; ethoxynonafluorobutane; tris(2,2,2-trifluroethyl) orthoformate; and di(2,2,2-trifluroethyl) carbonate.

14. A battery comprising an electrolyte comprised of a solvating solvent, diluent and a lithium salt, the electrolyte being a solution having a saturation point, the lithium salt being at least 5 times more soluble to less than 10 times more soluble in the solvating solvent than the diluent, and the solvating solvent and diluent are present in the electrolyte at a diluent/solvating solvent molar ratio of 0.1 to less than 5.

15. A method of forming an electrolyte comprising,
  a. dissolving a lithium salt in a solvating solvent to form a solvating solvent-lithium salt solution,
  b. dissolving a diluent in the solvating solvent-lithium salt solution, wherein the salt has a saturation point in the diluent that is at least 5 times less than in the solvating solvent, and
  c. further dissolving more lithium salt to a concentration that exceeds the amount of the lithium salt soluble in the solvating solvent present to form the electrolyte.

16. The method of claim 15, wherein the lithium salt present in the electrolyte is below the saturation point of the salt in the electrolyte.

\* \* \* \* \*